United States Patent [19]

Kafkis

[11] Patent Number: 4,627,538
[45] Date of Patent: Dec. 9, 1986

[54] VESSEL CLOSURES AND METHOD OF FORMING THE CLOSURES

[76] Inventor: Nick H. Kafkis, 8537 Skokie Blvd., Skokie, Ill. 60077

[21] Appl. No.: 715,920

[22] Filed: Mar. 25, 1985

[51] Int. Cl.$^4$ .................... B65D 27/12; B65D 85/00
[52] U.S. Cl. .................................................. 206/524.1
[58] Field of Search .......... 206/484, 621, 813, 524.1; 252/70; 215/1 C, 11 C, 228, 246, 306; 222/107, 541; 383/44; 53/476, 477, 478; 224/45.45 R, 42.03 A, 273, 280, 901; 248/205.3, 213.2, 102–105, 108, 318

[56] References Cited

U.S. PATENT DOCUMENTS

| | | | |
|---|---|---|---|
| 2,102,690 | 12/1937 | Fischer | 206/813 |
| 2,342,372 | 2/1944 | Scherer | 222/541 |
| 2,663,461 | 12/1953 | Brown | 222/107 |
| 2,758,735 | 8/1956 | Carter | 215/246 |
| 2,792,976 | 5/1957 | Stewart | 206/484 |
| 2,813,623 | 11/1957 | Colovos | 206/538 |
| 3,096,290 | 7/1963 | Duane et al. | 252/70 |
| 3,128,072 | 4/1964 | Shibata | 248/205.3 |
| 3,473,532 | 10/1969 | Eisenberg | 383/44 |

FOREIGN PATENT DOCUMENTS 0261390 4/1927 United Kingdom .................. 224/29

Primary Examiner—William Price
Assistant Examiner—Jimmy G. Foster
Attorney, Agent, or Firm—Silverman, Cass, Singer & Winburn, Ltd.

[57] ABSTRACT

Improved vessel closures and method of forming the closures. The vessels each include an elongate filling/-dispensing tube which has an open end which is sealed by the closures of the invention which can be disposable or reusable. The disposable closures can be formed by heat sealing the open end of the tubes or folding the open end of the tubes back upon the tube and shrinking material around the tube and open end. The reusable closures can be formed by plug-type, heat sealed ends which are shaped to be reinserted into the tubes and rings which can be placed over a folded over end and the tube. The vessels can include an adhesive pad to affix the vessel to a convenient surface.

18 Claims, 13 Drawing Figures

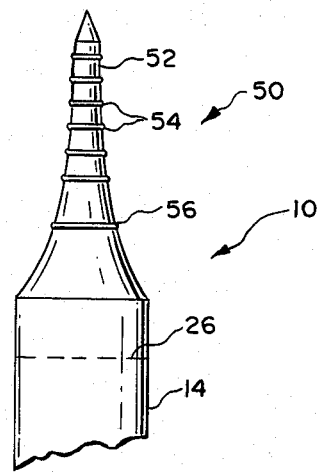
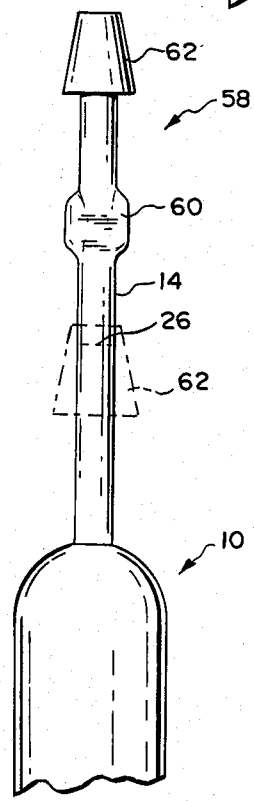
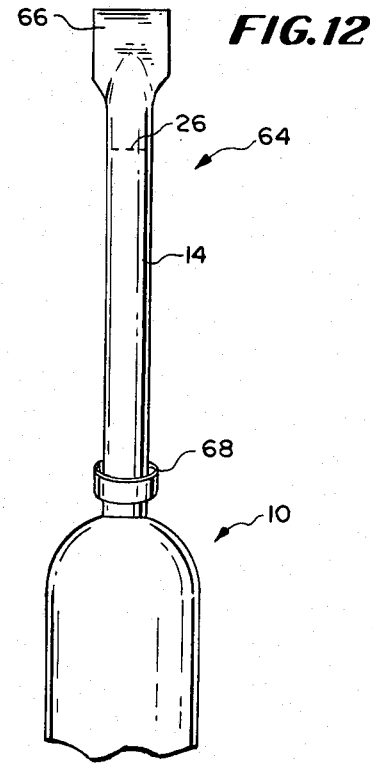

VESSEL CLOSURES AND METHOD OF FORMING THE CLOSURES

BACKGROUND OF THE INVENTION

The invention relates generally to vessel closures and more particularly to improved vessel closures for vessels of the type having filling/dispensing tubes.

There are numerous applications for vessels filled with various types of liquids. One problem in utilizing vessels with filling/dispensing tubes is filling the vessels without undue handling, complexity and expense. The filling of such vessels easily can be accomplished as disclosed in Application Ser. No. 718,489, entitled "A Method And Apparatus For Filling A Plurality Of Vessels", in the names of N. Kafkis, et al., filed concurrently herewith, which is incorporated herein by reference.

Once the vessels are filled, the second problem is easily and conveniently sealing the vessels for later use. The vessels should be sealed such that they can be stored and handled without leakage and once opened, it can be desirable to be able to reseal the vessels.

Therefore, there is a need for improved vessel closures which can be of the resealable or disposable types.

SUMMARY OF THE INVENTION

The disadvantages of prior art closures for vessels with filling/dispensing tubes are overcome in accordance with the present invention by providing closures which close the open ends of the tubes until use. The closures can be a portion of the tube and can be formed to be reusable. The closures can also be separate portions from the tubes and again can be reusable. The vessels also can include means for affixing them to a surface for later use.

BRIEF DESCRIPTION OF THE DRAWINGS

FIGS. 2-12 are side plan views of different closure embodiments of the present invention.

DESCRIPTION OF THE PREFERRED EMBODIMENTS

Figure 1:
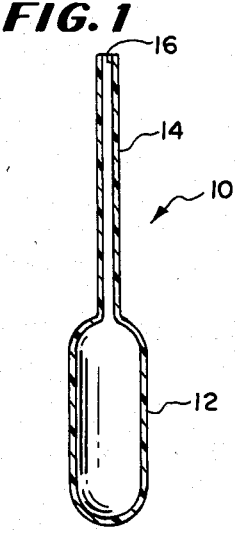
FIG. 1 is a side sectional view of a vessel which has a filling/dispensing tube and can utilize the closures of the present invention.

Referring to FIG. 1, a vessel or pipette 10 is best illustrated which can utilize the closures and method of forming the closures of the present invention. The vessel 10 includes a body 12 and a thin filling/dispensing tube 14 having an open end 16. The vessels 10 can be filled utilizing the method and apparatus of the above incorporated application, Ser. No. 718,489. Once filled, the vessels 10 can be sealed in a number of ways in accordance with the present invention as described with respect to FIGS. 2-12.

Figure 2:
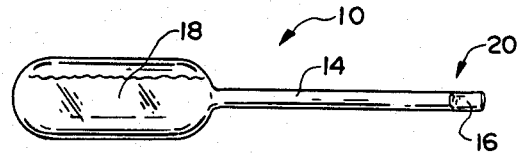

Referring to FIG. 2, the vessel 10 has been filled with a liquid 18 and is sealed with a permanent closure 20. The closure 20 is formed by heat sealing the open end 16 to itself. Preferably, the vessels 10 are formed from a polymer, such as polyvinyl chloride (pvc) or other semirigid material which can be sealed to itself. The closure 20 can be cut off when it is desired to reopen the vessel to dispense the liquid 18. Thus, the closure 20 is not reusable.

Figure 3:
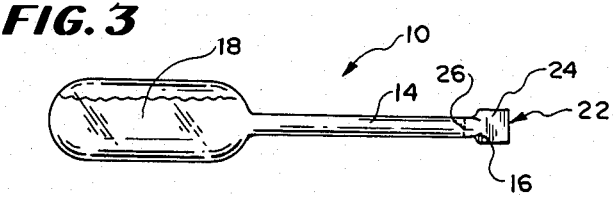

A second type of permanent closure 22 is best illustrated in FIG. 3. The closure 22 again is formed by heat sealing the open end 16 of the tube 14 to itself. In addition, the end 16 is flattened to form a substantially flat tab 24 which can be utilized to break the closure 22 off to open the tube 14 for use. The closure 22 preferably includes a scored line 26 around the tube 14 to facilitate the removal of the closure 22.

Figure 4:
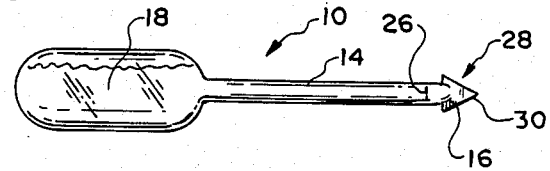

A reusable closure 28 is illustrated in FIG. 4. The closure 28 is again formed by heat sealing and flattening the open end 16 of the tube 14. The end 16 is flattened and formed into an arrow-shaped tab 30. The closure 28 also preferably includes the scored line 26 to assist in removing the closure 28. The arrow-shaped tab 30 is formed to fit into the tube 14 so that once the closure 28 has been removed, it can be reversed and reinserted into the tube 14 to reseal the tube 14 after use.

The closures 20 and 22 provide a good seal, but are not reusable. The closure 28 is reusable, but may not closely conform to the inside of the tube 14 and hence may not provide as good a seal as desired.

Figure 5:
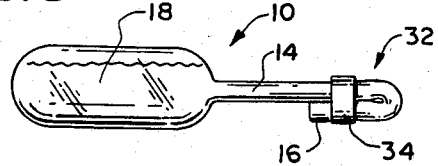

An improved reusable closure 32 is illustrated in FIG. 5. The closure 32 is a ring or hoop 34 which is sized to fit over the tube 14 with the open end 16 bent back against the tube to seal the tube. The ring 32 is placed back over the bent tube 14 as illustrated after the vessel 10 has been utilized.

Figure 6:
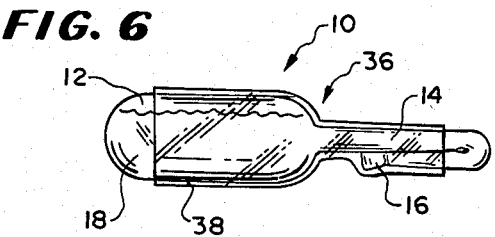
Figure 7:
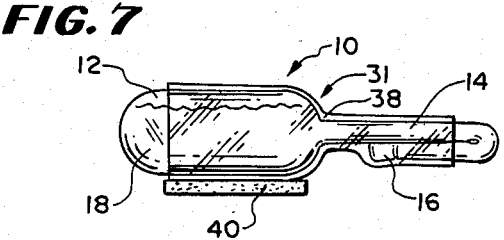

Another type of non-reusable closure 36 is best illustrated in FIGS. 6 and 7. The closure 36 is formed from a tube or sleeve 38 of heat shrinkable material, which is secured over the vessel body 12 and the folded over tube 14. The sleeve is then heat shrunk to form the closure 36 illustrated. The closure 36 can include a tab or score marks (not illustrated) to assist in removal of the closure 36 or it can otherwise be torn or cut away from the vessel 10 to utilize the liquid 18.

The closure 36 can include an adhesive pad 40 (FIG. 7) secured to the closure 36, which can be utilized to mount the vessel to any convenient surface for later use. The pad 40 can be utilized with any of the closures described and generally would be affixed directly to the vessel body 12.

Figure 8:
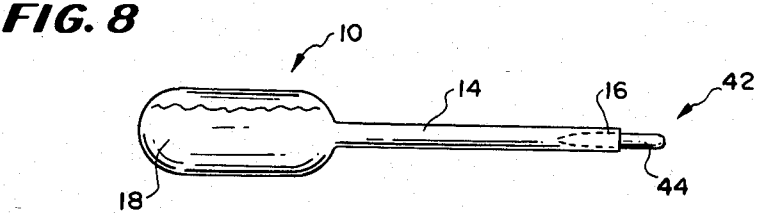

Another type of reusable closure 42 is illustrated in FIG. 8. The closure 42 is a separate solid plug 44, which can be formed from any convenient material and is sized to be slightly force fit into the open end 16 of the tube 14.

Figure 9:
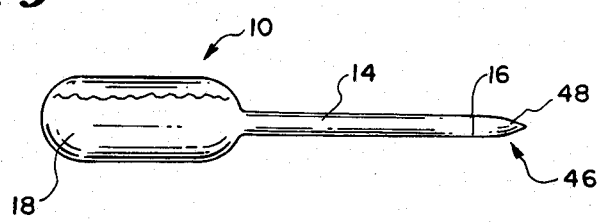
Figure 13:
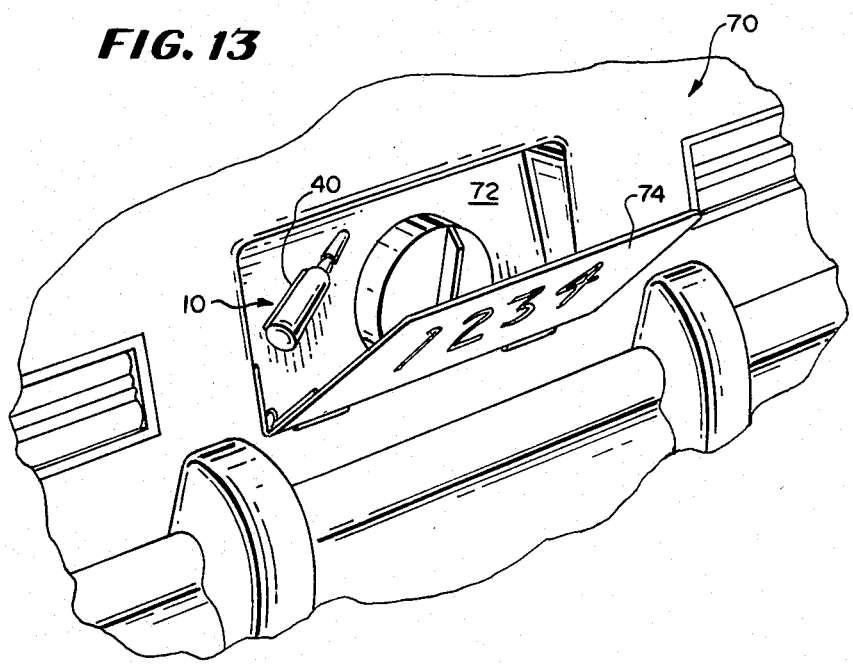
FIG. 13 is a partial perspective view of a vessel of the invention affixed to an automobile.

It would be preferable to utilize a plug-type closure which is not a separate element from the vessel 10, such as illustrated in FIGS. 9 and 10. A first unitary plug-type closure 46 is illustrated in FIG. 9. The closure 46 includes a plug 48 which is formed by melting or forming the open end 16 of the tube 14 into the plug-type shape. After opening, the plug 48 can then be reversed and reinserted into the tube 14 to reseal the tube 14 for later use.

A second unitary type of plug-type closure 50 is illustrated in FIG. 10. The closure 50 is formed by remolding the end of the tube 14 into a long drawnout plug 52 sized to fit in the open end of the tube 14 once the closure 50 is removed. The plug 52 can include a plurality of ridges 54 to assist in resealing the tube 14. The plug can further include a stop or shoulder 56 which is sized to abut against the open end of the tube 14 when the plug 50 is inserted therein.

Another type of resealable closure 58 is illustrated in FIG. 11. The closure 58 includes a heat sealed portion 60 and has a snap or screw-type cap 62 affixed onto the end of the tube 14. The closure 58 can be removed by breaking the tube 14 off at the score line 26. The cap 62 can be removed from the broken off portion and replaced on the open end to reseal the tube. The tube 14 can include ridges or threads as desired to assist in retaining the cap 62.

A resealable closure 64 is illustrated in FIG. 12. The closure 64 is essentially the same as the closure 22 and has a tab-type heat sealed end 66. The end 66 again can be removed by breaking it off at the scored line 26. The vessel 10 can be resealed by bending over the tube 14 back upon itself and inserting it under a ring 68 to form a seal like the closure 32. The ring 68 is placed on the tube 14 before the tab 66 is formed or the ring 68 can be expandable to be placed over the tab 66, but generally is of a size which will be retained on the tube 14 by the tab 66.

Modification and variations of the present invention are possible in light of the above teachings. The closure 36 as well as the vessel 10 can include advertising, instructions or ingredient listings. One particular desired use of the vessels 10 is for an automobile lock deicing liquid 18, in which case the pad 40 can be utilized to adhere the vessel 10 to the outside of an automobile 70. The vessel 10 can be affixed to a convenient surface 72, such as behind a license plate 74, for later use. It is therefore to be understood that within the scope of the appended claims, the invention may be practiced otherwise than as specifically described.

What is claimed and desired to be secured by Letters Patent of the United States is:

1. An improved vessel closure for a vessel having an elongate filling/dispensing tube with an open end, said vessel having a liquid therein, said improvement comprising:

the open end of said tube having a closed end, said closed end formed by a portion of the tube heat sealed to itself;
said tube further including means for reusably sealing said open end which can be utilized to reseal said tube after use; and
adhesive means secured to said vessel for affixing said vessel to a convenient surface, wherein said vessel includes a lock deicing liquid therein and said vessel is affixed to a surface on the outside of an automobile by said adhesive means.

2. The improvement as defined in claim 1 wherein said closed end is a substantially flat tab formed from said heat sealed portion on the end of said tube and said sealing means include a ring or hoop secured on said tube by said tab for resealing said tube after removal of said tab.

3. The improvement as defined in claim 1 including said heat sealed portion of the tube formed from said open end and said sealing means including cap-type means retained on said open end for resealing said tube after said tube is opened.

4. The improvement as defined in claim 1 wherein said heat sealed portion is a shaped plug forming said sealing means which can be reversed and inserted in said tube to reseal said tube after use.

5. The improvement as defined in claim 4 wherein said shaped plug is formed into a long drawn out plug with a plurality of ridges therearound to aid in resealing said tube.

6. The improvement as defined in claim 1 wherein said adhesive means include an adhesive pad adhered to said vessel for affixing said vessel to said convenient surface.

7. A method of sealing and mounting a vessel, comprising:

providing a vessel having an elongate filling/dispensing tube with an open end, said vessel having a liquid therein;
closing the open end of said tube by sealing said open end, including reusably sealing said open end by folding said open end of said tube back against said tube and securing said folded over open end to said tube; and
securing adhesive means to said vessel to affix said vessel to a convenient surface, including securing said folded over open end to said tube by placing a tube of heat shrinkable material over at least said open end and said tube and heat shrinking said material to form said seal.

8. The method as defined in claim 7 wherein securing said adhesive means includes adhering an adhesive pad to said heat shrunk material for affixing said vessel to said convenient surface.

9. An improved vessel closure for a vessel having an elongate filling/dispensing tube with an open end, said vessel having a liquid therein, said improvement comprising:

the open end of said tube having a closed end, said closed end includes means for reusably sealing said open end which can be used to reseal said tube after use, said means for reusably sealing said open end include said open end of said tube folded back and secured against said tube, and adhesive means secured to said vessel for affixing said vessel to a convenient surface, said folded over open end is secured to said tube by a tube of heat shrinkable material placed and heat shrunk over said open end and said tube to form said seal.

10. The improvement as defined in claim 9 wherein said adhesive means include an adhesive pad adhered to said heat shrunk material for affixing said vessel to said convenient surface.

11. A method of sealing and mounting a vessel, comprising:

providing a vessel having an elongate filling/dispensing tube with an open end, said vessel having a liquid therein;
closing the open end of said tube by sealing said open end, including reusably sealing said open end by folding said open end of said tube back against said tube and securing said folded over open end to said tube; and
securing adhesive means to said vessel to affix said vessel to a convenient surface, including securing said folded over open end to said tube by placing a tube of heat shrinkable material over at least said open end and said tube and heat shrinking said material to form said seal, including said vessel having a lock deicing liquid therein and adhering said vessel and adhesive means to a surface on the outside of an automobile.

12. A method of sealing and mounting a vessel, comprising:

providing a vessel having an elongate filling/dispensing tube with an open end, said vessel having a liquid therein;
closing the open end of said tube by sealing said open end, including sealing said open end by heat sealing a portion of the tube to itself;

providing means for reusably sealing said open end which can be utilized to reseal said tube after use; and securing adhesive means to said vessel to affix said vessel to a convenient surface, including said vessel having a lock deicing liquid therein and adhering said vessel and adhesive means to a surface on the outside of an automobile.

13. The method as defined in claim 12 including forming a substantially flat tab heat sealed end portion and said sealing means including placing a ring or hoop on said tube to be retained by said tab for resealing said tube after removal of said tab.

14. The method as defined in claim 12 including forming said heat sealed portion of the tube spaced from said open end and said sealing means including placing cap-type means on said open end for resealing said tube after said tube is opened.

15. The method as defined in claim 12 including forming said sealed tube portion in the form of a shaped plug to form said sealing means which can be reversed and inserted in said tube to reseal said tube after use.

16. The method as defined in claim 15 including forming said shaped plug into a long drawn out plug with a plurality of ridges therearound to aid in resealing said tube.

17. The method as defined in claim 12 wherein securing said adhesive means includes adhering an adhesive pad to said vessel for affixing said vessel to said convenient surface.

18. An improved vessel closure for a vessel having an elongate filling/dispensing tube with an open end, said vessel having a liquid therein, said improvement comprising:

the open end of said tube having a closed end, said closed end includes means for reusably sealing said open end which can be used to reseal said tube after use, said means for reusably sealing said open end include said open end of said tube folded back and secured against said tube, and adhesive means secured to said vessel for affixing said vessel to a convenient surface, said folded over open end is secured to said tube by a tube of heat shrinkable material placed and heat shrunk over said open end and said tube to form said seal, wherein said vessel includes a lock deicing liquid therein and said vessel is affixed to a surface on the outside of an automobile by said adhesive means.

* * * * *